Dec. 31, 1935.  M. M. DRAKE  2,026,163
VALVE
Filed Feb. 5, 1932  2 Sheets-Sheet 2
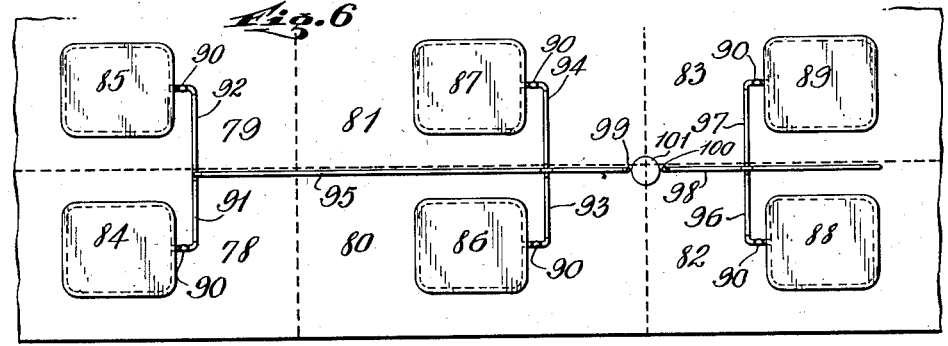
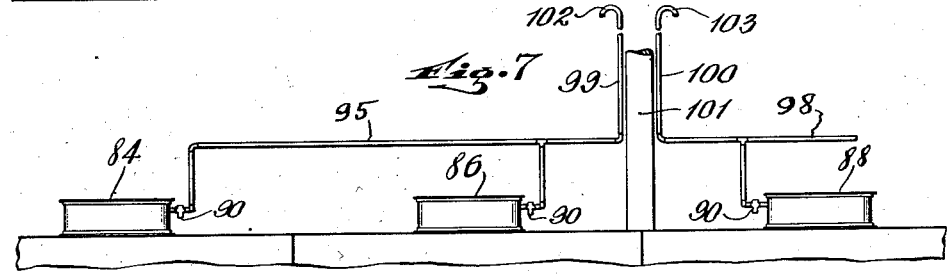
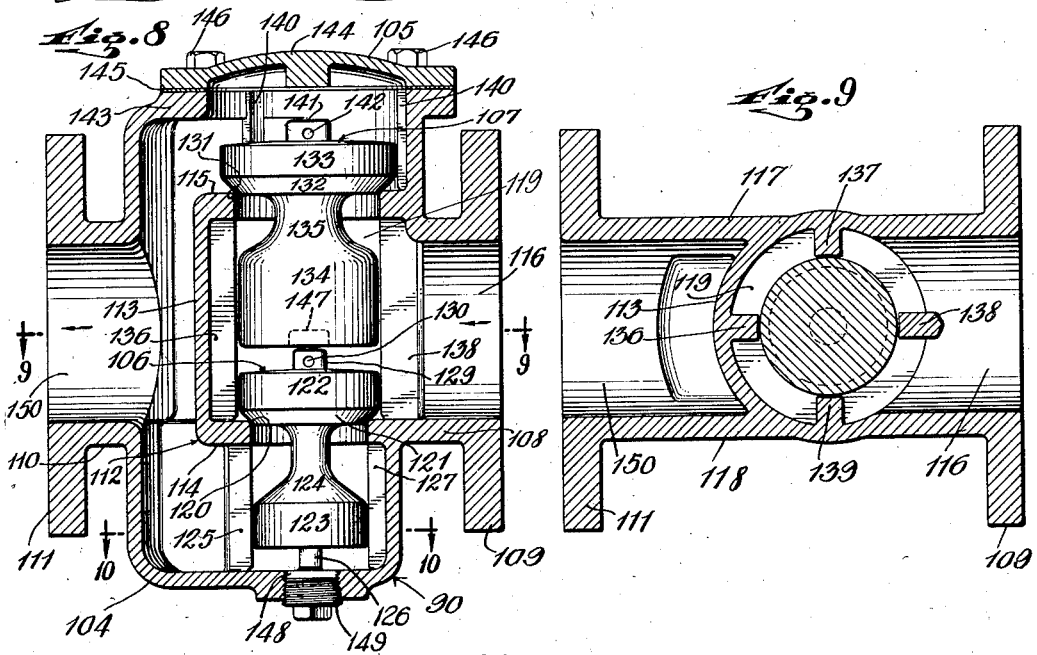
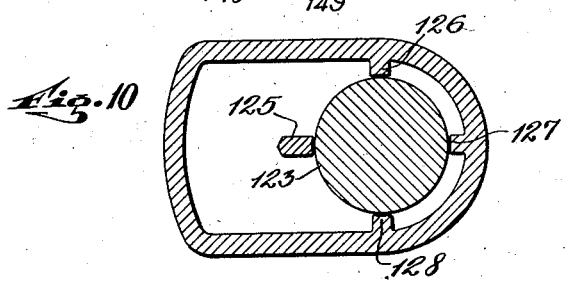
INVENTOR.
Marcus M. Drake,
BY Gustav Drews
his ATTORNEY Patented Dec. 31, 1935

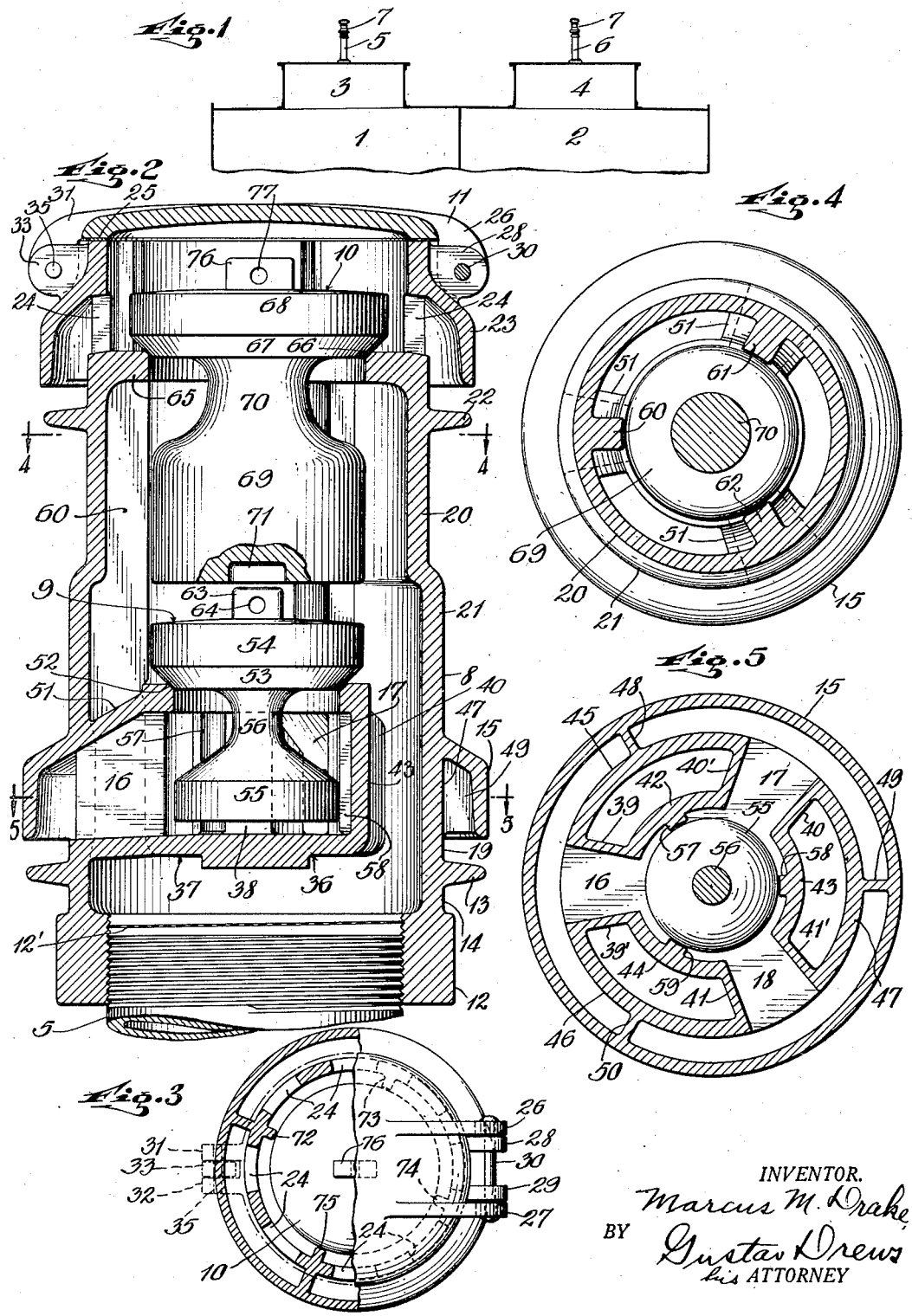

2,026,163

UNITED STATES PATENT OFFICE 2,026,163

VALVE

Marcus M. Drake, Brooklyn, N. Y., assignor to
The Mechanical Marine Company, New York,
N. Y.

Application February 5, 1932, Serial No. 591,019

9 Claims. (Cl. 277—61)

This invention relates to valves in general and more especially to vacuum and relief valves for use with containers of volatile and highly expansible fluids or fuel oil and the like.

In practice heretofore, it has been customary to fit containers such as tank vessels, tank cars and storage tanks generally with vents of some description so that the containers may be efficiently sealed against the admission of the elements or foreign matter to prevent the contamination of the contents of such containers.

This practice was especially important when the containers were used for carrying fluids such as fuel oils, edible oils and other like fluids that become volatile and quickly expanded with a slight rise in temperature.

This practice was also important to protect the walls of the structure from collapse or rupture.

The goose neck open type vent was at one time extensively used but it was not satisfactory since it did not prevent the escape of valuable gases due to the evaporation of the volatile contents of the containers. Combination vacuum and relief valves then came into use. The type mainly used, especially in marine practice, was controlled by springs. This spring control valve likewise has not given the best of satisfaction. It has proven unreliable and expensive to maintain in proper working order mainly on account of the corrosion which would readily set in unless they received constant and careful attention. Owing to the construction of such spring loaded valves, they are furthermore difficult to open for examination and overhauling and so are liable to be neglected.

More recently weight loaded valves have been tried in an attempt to solve the difficulties encountered with the latter spring controlled valves which attempts have been successful in part.

As an instance, when these combination vacuum and relief valves or vacuum and vent valves are used for service on oil tanks and especially on sea going oil tankers, they are subjected to many corrosive influences, on the outside from the elements and on the inside from the corrosive nature of the contents. The valves also are often required to function in the presence of highly explosive gases.

It is therefore desirable that these valves be made not only of a durable and reliable material that is corrosion resisting but also in the interest of safety that these valves be made of a non-magnetic and non-sparking material.

Furthermore the weight loaded valves heretofore in use have been heavy and cumbersome, therefore expensive to manufacture and difficult and expensive to handle, and install.

In view of the foregoing, the present invention aims to provide an improved combination vacuum and relief valve composed of a suitable metal comparatively light in weight, practically immune to corrosion, especially from the ordinary elements encountered at sea and the ordinary gases of the contents to be carried. The following is a typical formula for the kind of metal suitable for the structure disclosed herein:

|  | Per cent |
|---|---|
| Total carbon | 2.80 to 3.10 |
| Manganese | 2.25 to 3.00 |
| Phosphorus | Under 0.30 |
| Sulphur | Under 0.12 |
| Silicon | 1.20 to 2.20 |
| Nickel | 12.50 to 14.00 |
| Copper | 5.50 to 6.50 |
| Chromium | 0.75 to 1.25 |

It is still another object of the present invention to provide an improved combination vacuum and relief valve having a minimum number of parts, essentially four in number and requiring a minimum amount of machine work thereby to reduce the cost of manufacture and raw material to a minimum.

It is still another object of the present invention to provide an improved combination vacuum and relief valve which is comparatively weather proof, simple to install, reliable in operation and readily accessible for inspection, cleaning and overhauling.

It is still another object of the present invention to provide an improved combination vacuum and relief valve of the weight loaded type especially adapted for sea going tankers in that they will automatically seat themselves and remain seated without difficulty at the average angle to the vertical that the ship might assume even at the average high sea.

A special feature of the present invention also resides in the fact that the valve may readily adapt itself to standardization so that with slight changes in the diameter of the valve openings or weights the same can be provided to accommodate the various pressures and various degrees of vacuum.

Still another feature of the invention is the equipment of the valves so that they can be readily manipulated for grinding or removal.

These and other features, capabilities and advantages of the invention will appear from the subjointed detail description of specific embodiments thereof illustrated in the accompanying drawings in which Figure 1 is a diagrammatic elevation of a tank arrangement on a vessel equipped with one embodiment of the present invention;

Fig. 2 is a longitudinal section of one embodiment of the combination vacuum and relief valve constituting the main part of the present invention;

Fig. 3 is a plan view partly broken away and on a slightly smaller scale than Fig. 2;

Fig. 4 is a transverse section on the line 4—4 of Fig. 2; on a scale smaller than Fig. 2 but larger than Fig. 3;

Fig. 5 is a transverse section on the line 5—5 of Fig. 2; on a scale similar to that of Fig. 4;

Fig. 6 is a diagrammatic plan view of a portion of a sea going tanker equipped with another embodiment of the present invention;

Fig. 7 is a diagrammatic side elevation of the tank arrangement illustrated in Fig. 6;

Fig. 8 is a longitudinal section of the combination vacuum and relief valve used with the embodiment illustrated in Fig. 6;

Fig. 9 is a transverse section on the line 9—9 of Fig. 8; and

Fig. 10 is a section on the line 10—10 of Fig. 8, on a scale larger than that of Fig. 8.

The combination vacuum and relief valve constituting the embodiment illustrated in Figs. 2 to 5 inclusive is used independently one valve to a tank as a rule. The tanks 1 and 2 illustrated in Fig. 1 are equipped with the ordinary hatch trunks 3 and 4 having formed thereon the stand pipes 5 and 6, at the upper end of which are secured the pressure and vacuum relief valves 7.

The pressure and vacuum relief valves 7, see Fig. 2, consist essentially of four parts to wit, an outer casing or body 8, a vacuum valve 9, a pressure valve 10 and a cover 11. The casing or body 8 is provided with an annular connection or connecting member 12 internally screw threaded to engage the externally screw threaded portion of the stand pipe 5 or 6.

Above the connection 12, there is provided an annular fin 13 spaced from the casing 12 by the annular recess 14. Above the annular fin 13, there is provided the annular skirt 15 extending downwardly over the outlets of the vacuum ports 16, 17 and 18, the annular wall portion 19 of the casing 8 being disposed between the ports 16, 17 and 18 and the fin 13.

In the present instance, the casing 8 has its upper main wall 20 slightly smaller in diameter than the lower main wall 21. Near the upper portion of the main wall 20, there is provided the annular outwardly extending fin 22 which is disposed beneath and spaced from the annular skirt 23 extending down over the inlets to the pressure ports 24, the main wall portion 20 extending up above the fin 22 and above the level of the lower end of the skirt 23. Above the skirt 23 the main housing 8 is closed by the cover 11 which preferably sits on the gasket 25 mounted on the upper end of the housing 8 to seal this opening when the cover 11 is in place.

The cover 11 is preferably provided, see Fig. 3, with the ears 26 and 27 disposed outside of the ears 28 and 29 formed on the casing 8 to receive the pivot pin 30. The opposite end of the cover 11 is preferably provided with two parallel ears 31 and 32 to receive between them the ear 33 of the casing 8, which ears 31, 32 and 33 when the cover is in closed position have alined openings to receive the anchor pin 35.

To form a support for the seat and guides of the vacuum valve 9, the bracket 36 is provided. The bracket 36, see particularly Fig. 5, has a bottom wall 37 forming the bottom of the chamber 38 in which the lower portion of the vacuum valve 9 is slidably disposed and the bottom of the ports 16, 17 and 18 extending therefrom. This bracket also has a plurality of vertical walls 39, 39', 40, 40' and 41, 41' which are substantially radial to the center of the casing 8 and are formed in pairs of walls 39 and 39' forming the side walls of the port 16, the walls 40 and 40' forming the side walls of the port 17 and the walls 41 and 41' forming the side walls of the port 18.

The bracket 36 also has in the present instance three arcuate vertical walls 42, 43 and 44 substantially concentric to the casing 8. The walls 39 and 40' connect the extension 45 of the annular wall 19 with the arcuate wall 42, the walls 39' and 41 connect the extension 46 of the annular wall 19 with the arcuate wall 44 and the walls 40 and 41' connect the extension 47 of the annular wall 19 with the arcuate wall 43. The skirt 15 is preferably reinforced by the vertical webs 48, 49 and 50 which in the present instance are equally spaced from one another, the web 48 connecting the skirt 15 with the extension 45, the web 49 connecting the skirt 15 with the extension 47 and the web 50 connecting the skirt 15 with the extension 46.

The upper portions of the ports 16, 17 and 18 are provided with the inclined roof wall members 51 which shut off the ports 16, 17 and 18 from communication with the interior of the casing 8 above the bracket 36.

The bracket 36, see Fig. 2, is provided with a central opening at the upper end of the chamber 38 and provided with an inclined valve seat 52 to receive the inclined face 53 of the vacuum valve 9 in closed position whereby communication to the outside atmosphere from the interior of the casing 8 through the chamber 38, ports 16, 17 and 18 and mouths of the skirt 15 is normally shut off or closed. The valves 9 and 10 are characterized by a valve head, a main body and an intervening neck. The main body is provided primarily to form a weight to cause the valve to seat by the operation of gravity and the distribution of weight of the valve between the head and main body is such as to bring the center of gravity well below the valve head so that with the ordinary inclined positions of a sea going vessel at high seas, it will cause the valve head to remain seated when the opening emergency is not present.

The valve 9 has as an instance a disc-shaped, cylindrical head 54 which is connected to the weight forming body 55 by the neck 56, the seat engaging face 53 being disposed adjacent to the neck 56. The weight forming body 55 preferably has an extended cylindrical outer surface normally concentric with the casing 8 and formed primarily to cooperate with the vertical guiding fins 57, 58 and 59 which in the present instance are disposed to extend inwardly from the middle of the walls 42, 43 and 44 respectively.

The inner faces of these fins 57, 58 and 59 preferably aline or register with the innermost edge of the valve seat 52 so that the valve 9 may be moved upwardly out of the bracket 36 through the valve seat 52. The valve head 54 preferably has an outer diameter considerably larger than that of the valve seat 52 and is preferably provided with an outer cylindrical surface concentric with the casing 8 to cooperate with the vertically extending guides, three being provided in the present instance, to wit 60, 61 and 62, which extend inwardly from the wall portions 20 and 21 of the casing 8 and have inner arcuate faces which are substantially concentric with the casing 8 to cooperate in part with the cylindrical face of the head 54. The head 54 is preferably provided at its upper end with a lug 63 having an orifice 64 therein to be engaged by a hook or other instrument either for withdrawing the vacuum valve 9 upwardly out of the casing 8 after the valve 10 has been removed and of course the cover 11 opened. The lug 63 is also provided for the engagement of a grinding tool by means of which the valve seat 52 and face 53 may be ground in the usual way.

The guides 60, 61 and 62 preferably as shown extend up from the top walls 51 of the ports 16, 17 and 18 up to the annular flange 65 extending inwardly from the wall portion 20 and terminating in alinement with the inner faces of the guides 60, 61 and 62. The upper inner edge of this flange 65 is preferably inclined to form the valve seat 66 for the pressure or relief valve 10 to engage the inclined face 67 of said relief valve 10.

The valve 10 is provided with a head 68, a weight forming body 69 and an intervening neck 70 adjacent to the inclined face 67 of the head 68. The weight forming body 69 is preferably provided with an extended cylindrical outer surface concentric with the casing 8 and just clearing the guides 60, 61 and 62 to be guided thereby in the vertical movement of the valve 10.

The lower end of the weight forming body 69 is preferably provided with a circular orifice 71 to serve as an additional clearance for the lug 63.

The head 68 has a diameter considerably greater than the diameter of the weight forming body 69 and also is provided with a cylindrical outer surface concentric with the casing 8 to cooperate with a plurality of guiding fins, four being shown in the present instance to wit, see Fig. 3, the fins 72, 73, 74 and 75, the inner faces of which are preferably concentric with the casing 8 and formed to provide vertical guides for the head 68.

The head 68 is also provided with a lug 76 having an opening 77 therein to form a handle or accommodate a hook or other instrument either for removing the valve 10 or for grinding the same.

From the foregoing, it will appear that when the cover 11 is open the valve 9 may first be moved into place along the guides 60, 61 and 62 until its weight forming body 55 slidably engages the guides 57, 58 and 59 and the inclined face 53 engages the seat 52, whereupon the valve 10 may be moved into place with the weight forming body 69 slidably engaging the guides 60, 61 and 62 until the face 67 of its head engages the seat 66 of the flange 65, whereupon the cover may be closed and locked in place by the pin 35 in the usual way.

From the foregoing, it will appear that the interior of the tank equipped with this compound valve will communicate with the lower face of the valve 10 to raise the same should the pressure therein exceed the predetermined pressure to afford relief and in turn the outer atmosphere will cooperate with the lower face of the valve head 54 of the valve 9 to raise the same in case the atmospheric pressure exceeds the interior pressure within the predetermined limits.

It will also be apparent that to meet the pressure requirements, the valves 9 and 10 can easily be constructed to increase or decrease the weight thereof and similarly the areas of the valve ports may be varied without departing from the general construction of the valve and thus facilitate standardizing this type of valve for a great variety of pressures and furthermore that even for a given equipment, the valves may be changed to meet a different pressure requirement by changing the weight of the valve members and valve 10 port areas without removing a given equipment, which latter might become important when a tanker for instance is going in one direction with one type of fluid having one pressure requirement and returning in the other direction with another type of fluid having another pressure requirement.

It is of course well known that while the average tanker is not interchangeably used for fuel oils and edible oils, it may be interchangeably used for crude oil and refined oil or crude oil, refined oil and high test casing head gasoline.

These several main elements of the valve, to wit the casing 8, vacuum valve 9, relief valve 10 and cover 11 and also the pins 30 and 35 in the present instance are preferably made of a corrosion resisting metal which is in addition non-magnetic and non-sparking so that the valve equipment will be substantially weather proof not only as to moisture but also as to the salt water of the sea and in addition be safe with highly explosive gases such as high test casing head gasoline.

It is also desirable that these several valve parts will be comparatively light in weight, easy to handle and manufacture and low in cost. Excellent results have been obtained with the kind of metal which has already been developed and which is comparatively light in weight, practically immune to corrosion, non-magnetic and non-sparking. It will also be obvious from the valves 9 and 10 and the clearance formed above the same that in case of an emergency they will be free to effectively open the valve members although in practice the change in pressures will ordinarily be gradual and it has been found that even when loading or unloading a tank these valves will merely chatter on their seats while the pressure changes.

Preferably these valve casing are also provided with a frame screen such for instance as the screen 12' secured in the connection 12 of the casing 8 which is preferably composed of some corrosion resisting metal such as Monel metal or the like.

In the embodiment shown in Figs. 6 to 10 inclusive, an arrangement is shown which is used with the so-called inclosed type as distinguished from the atmospheric type, although in the final analysis relief to and from atmosphere is also depended upon in this arrangement except that the opening to and from the atmosphere is remote from the tank and individual valve members.

In Fig. 6, an arrangement of tanks 78, 79, 80, 81, 82 and 83 such as is common on a sea going tanker is shown in plan with the hatches 84, 85, 86, 87, 88 and 89. Each of the hatches is provided with a combination vacuum and relief valve 90 such as illustrated in detail in Fig. 8.

The valves 90 of the hatches 84, 85, 86 and 87 are connected by the branchway conduits 91, 92, 93 and 94 to the main conduit 95. The valves 90 of the hatches 88 and 89 are connected by the branchway conduits 96 and 97 to the main conduit 98. The main conduits 95 and 98 are connected to the upright conduits 99 and 100 extending up alongside of the mast 101 of the vessel and preferably terminating in the hooked extensions 102 and 103, the mouths of which face downwardly to protect the same from the reception of rain, snow and the like. These extensions 99 and 100 are also preferably provided with flame screens preferably composed of some suitable corrosion resisting metal such for instance as Monel metal or the like.

The valves 99 in the present instance are also composed of four main elements, to wit the casing 104, the cover 105, the vacuum valve 106 and the pressure or relief valve 107. The casing 104 in the present instance has a cylindrical extension 108 preferably provided with an annular flange 109 to be connected to the conduit from the tank. The casing 104 is also preferably provided with a laterally extending member 110 provided with an annular flange 111 to be connected to the conduit members communicating with the upright extensions 99 or 100.

The casing 104 is also provided with a bracket 112 having a vertically extending arcuate wall portion 113, a lower annular flange portion 114, an upper annular portion 115 forming a chamber in communication with the opening 116 formed in the conduit 108. The bracket 112 as shown in Fig. 9 continues into the lateral walls 117 and 118 of the casing 104 and forms with it the lateral wall for the chamber 119 in communication with the opening 116.

The lower annular flange 112 preferably has an upper inner inclined valve seat 120 to receive the inclined face 121 of the vacuum valve 106.

The vacuum valve 106 consists essentially of a head 122, a weight forming body 123 and an intervening neck 124 disposed adjacent to the inclined face 121 of the head 122. The weight forming body 123 is preferably provided with an extended cylindrical surface concentric to the valve 106 and slightly smaller in diameter than the diameter of the opening through the flange 114.

The chamber formed below the annular flange 114 of the casing 104 is preferably provided with a plurality of vertically extending guides, there being in the present instance shown four such guides, to wit the guides 125, 126, 127 and 128, the inner faces of which are preferably arcuate and concentric to the weight forming body 123 to facilitate the vertical slidability of the body 123 relative to such guides.

The head 122 is preferably provided with a lug 129 having an orifice 130 formed therein to serve as a handle or to receive a hook or other instrument to facilitate manipulating the valve 106 either to remove the same or to grind the same.

The flange 115 is preferably provided with an upper annular inner inclined valve seat 131 to receive the inclined face 132 of the valve 107. The valve 107 consists essentially of a head 133, a weight forming body 134 and an intervening neck 135 disposed adjacent to the inclined face 132.

The weight forming body 134 preferably has an extended outer cylindrical surface concentric with the valve 107 and just clearing the guides formed in the casing 112 so that the valve 107 and especially its body 134 may be guided by such guides, to wit the guides 136, 137, 138 and 139 vertically extending in the chamber 119 and having arcuate inner faces concentric with the body 134. The head 122 of the valve 106 has an extended outer cylindrical surface the diameter of which is considerably larger than the body 123 but sufficient just to clear the guides 136, 137, 138 and 139 so that not only the body 134 of the valve 107 but also the head 122 of the valve 106 will be guided by these guides 136, 137, 138 and 139.

The head 133 of the valve 107 is also provided with an outer cylindrical surface, the diameter of which is greater than the diameter of the body 134 but small enough to clear the guides formed in the chamber disposed above the bracket 112, in the present instance provision being made for three of them, to wit the guides 140 equally spaced from one another, only two being shown the third being disposed in the part of the casing cut off by the section. These guides 140 are also provided with inner cylindrical faces concentric with the head 133 to facilitate the vertical slidability of the same. The head 133 is provided with a lug 141 having an orifice 142 therein to serve as a handle or abutment for a hook or other instrument used for removing the valve 107 or for grinding the same. The upper end of the casing 104 terminates in an annular shoulder 143 which is provided with a cover 144, the annular flange of which engages the gasket 145 located between the shoulder 143 and the cover 144. The annular flange of the cover 144 is preferably provided with the bolts 146 engaging the shoulder 143 to lock the cover 144 in place.

In order to afford additional clearance when desired for the vacuum valve 106, the body portion 134 of the pressure valve 107 is preferably provided with a recess 147 disposed centrally in its lower end.

To facilitate flushing the casing 104 and cleaning the same from any accumulation of sediment and the like the lower end is generally provided with an opening 148 to receive a screw threaded plug 149 normally to close the same.

The valve illustrated in Figs. 8, 9 and 10 in its operation is substantially identical to the valve illustrated in Figs. 2 to 5 inclusive, the atmospheric pressure in the conduits leading to the uprights 99 and 100 acting upon the lower faces of the vacuum valves to raise the same should the pressure in the tanks drop below atmospheric pressure within certain limits. Likewise, the weight of the valves 107, together with the atmospheric pressure upon the upper faces of these valves is not sufficient to resist a predetermined gas pressure in the tanks, and hence, excessive pressure built up in the tanks is relieved by automatic raising or opening of these valves in response to the differential pressure.

The valves of this embodiment are preferably composed of light, non-corrosive, non-magnetic and non-sparking metal and for similar reasons it may also be desirable to produce the conduits equipped with this embodiment of the same kind of metal.

It is of course obvious that the communication from the opening 116 of the conduit connection 108 to the opening 150 of the conduit connection 110 will be exclusively established through the opening in the flange 114 and through the chamber formed below the bracket 112 when atmospheric pressure exceeds the pressure in the tank within certain limits and that in turn the communication from the opening 116 of the conduit connection 108 to the opening 150 of the conduit connection 110 will be exclusively provided through the chamber 119, the opening formed in the annular flange 115 and chamber formed above the same, and then to one side of the bracket 112 when the pressure in the tank exceeds atmospheric pressure within certain limits.

From the foregoing, it will appear that in the embodiment illustrated in Fig. 2, the bracket 36 and annular flange 65 form between them a central chamber which communicates with the vacuum sensitive chamber formed within the bracket 36 and also with the pressure sensitive chamber formed above the annular flange 65. This central chamber furthermore is in constant communication with the device to be protected, to wit the tank 1 or 2 through the connection 12.

In turn the embodiment illustrated in Fig. 8 is provided with a central chamber in direct communication with the device to be protected by means of the conduit member 116. This central chamber formed by the bracket 112 also communicates with the vacuum sensitive chamber formed below the same and with the pressure sensitive chamber formed above the same.

The vacuum and pressure sensitive chambers in both instances are of course controlled by the gravity controlled valves there illustrated.

It is obvious that various changes and modifications may be made to the details of construction without departing from the general spirit of the invention as set forth in the appended claims.

I claim:

1. A combination vacuum and relief valve having a casing, wall members in said casing forming a pressure sensitive chamber, a vacuum sensitive chamber and a central chamber in communication with the device to be protected and said pressure sensitive and vacuum sensitive chambers, a valve controlling the communication between said pressure sensitive chamber and said central chamber, a second valve controlling the communication between said vacuum sensitive chamber and said central chamber, said valves being entirely confined within said casing, said valves having cylindrical heads larger than their communications and having narrower cylindrical depending body portions, the diameter of the head of the vacuum sensitive valve and the diameter of the body of the pressure sensitive valve being the same, vertical guides in said casing to slidably engage the head of said pressure sensitive valve, vertical guides to slidably engage the body of the vacuum sensitive valve, and common vertical guides slidably to engage both the body of the pressure sensitive valve and the head of the vacuum sensitive valve.

2. A combination vacuum and relief valve having a casing, wall members in said casing forming a pressure sensitive chamber, a vacuum sensitive chamber and a central chamber in communication with the device to be protected and said pressure sensitive and vacuum sensitive chambers, a valve controlling the communication between said pressure sensitive chamber and said central chamber, a second valve controlling the communication between said vacuum sensitive chamber and said central chamber, said valves being entirely confined within said casing, said valves having cylindrical heads larger than their communications and having narrower cylindrical depending body portions, the diameter of the head of the vacuum sensitive valve and the diameter of the body of the pressure sensitive valve being the same, vertical guides in said casing to slidably engage the head of said pressure sensitive valve, vertical guides to slidably engage the body of the vacuum sensitive valve, and common vertical guides slidably to engage both the body of the pressure sensitive valve and the head of the vacuum sensitive valve, said valves being coaxial to one another and so arranged that they may be successively removed past said guides without disassembling the structure.

3. A combination vacuum and relief valve having a casing, wall members in said casing forming a pressure sensitive chamber, a vacuum sensitive chamber and a central chamber in communication with the device to be protected, said wall members having valve seats formed directly thereon between said central chamber and said vacuum sensitive chamber, and between said central chamber and pressure sensitive chambers, the valve seat for the vacuum sensitive chamber being disposed below the valve seat for the pressure sensitive chamber and in alinement therewith and also of smaller diameter, valves cooperating with said seats to control the communications from said central chamber to said vacuum sensitive and pressure sensitive chambers, each valve having a head larger than its valve seat and a downwardly hanging narrower weight forming body to locate the valve center of gravity below the valve seat, the weight forming body of the upper valve and the head of the lower valve having substantially the same diameter to pass through the upper valve seat and the diameter of the weight forming body of the lower valve conforming to the diameter of the lower valve seat to pass through, and separate guiding means for each valve for guiding each valve in non-tilting relation in all of its phases of operation.

4. A combination vacuum and relief valve having a casing, wall members in said casing forming a pressure sensitive chamber, a vacuum sensitive chamber and a central chamber in communication with the device to be protected, said wall members also forming seats between said central chamber and said vacuum sensitive and pressure sensitive chambers, the valve seat for the vacuum sensitive chamber being disposed below the valve seat for the pressure sensitive chamber and in alinement therewith and also of smaller diameter, valves cooperating with said seats to control the communications from said central chamber to said vacuum sensitive and pressure sensitive chambers, each valve having a head larger than its valve seat and a depending narrower weight forming body, the weight forming body of the upper valve and the head of the lower valve having substantially the same diameter to pass through the upper valve seat and the diameter of the weight forming body of the lower valve conforming to the diameter of the lower valve seat to pass through it, and vertical guides in said casing to slidably engage the heads and weight forming bodies of the valves.

5. A combination vacuum and relief valve having a casing, wall members in said casing forming a pressure sensitive chamber, a vacuum sensitive chamber and a central chamber in communication with the device to be protected and said pressure sensitive and vacuum sensitive chambers, a valve controlling the communication between said pressure sensitive chamber and said central chamber, and a second valve controlling the communication between said vacuum sensitive chamber and said central chamber, there being an annular series of openings between said pressure sensitive chamber and the atmosphere, there being an annular series of openings between said vacuum sensitive chamber and the atmosphere, two annular skirts, each annular skirt overhanging one series of annular openings and two annular fins, each annular fin being disposed below the opening to a skirt but spaced therefrom to form a lateral mouth below its series of annular openings.

6. A combination vacuum and relief valve having a casing, wall members in said casing forming a pressure sensitive chamber, a vacuum sensitive chamber and a central chamber, there being a lateral opening in said casing to afford communication from said central chamber to the device to be protected, there being a second lateral opening in said casing to afford communication between said pressure sensitive and vacuum sensitive chambers to a conduit in communication with the atmosphere, a valve seat for the communication between said central chamber and said pressure sensitive chamber, a second valve seat for the communication between said central chamber and said vacuum sensitive chamber, a valve cooperating with the valve seat in said pressure sensitive chamber, and a second valve cooperating with the valve seat in said vacuum sensitive chamber, there being an opening formed in the bottom of said casing to facilitate flushing the same when desired.

7. A combination vacuum and relief valve construction comprising a plurality of casings; each casing having wall members forming a pressure sensitive chamber, a vacuum sensitive chamber and a central chamber; a pair of conduits leading from opposite sides of each casing, each casing having lateral openings communicating respectively with the conduits, one of the openings in each casing establishing communication from said central chamber through its conduit to the device to be protected, the other opening in each casing communicating with the pressure sensitive chamber and with the vacuum sensitive chamber, a valve seat formed in the wall structure of each casing to facilitate communication between the central chamber and the pressure sensitive chamber, a second valve seat formed in the wall structure on each casing to facilitate communication between the central chamber and the vacuum sensitive chamber, valves normally closing said seats, and a common pipe communicating with the atmosphere and with the last mentioned opening on each casing through one of said conduits.

8. A combination vacuum and relief valve having a casing; wall members in said casing forming a pressure sensitive chamber and a central chamber in communication with the device to be protected; said central chamber communicating in opposite directions with the pressure sensitive and vacuum sensitive chambers, a valve controlling the communication between said pressure sensitive chamber and said central chamber, a second valve controlling the communication between said vacuum sensitive chamber and said central chamber, said casing having valve seats for the valves, and vertical spaced guides formed as radial flanges in the walls of said chambers, portions of said guides being common to both valves, said valves slidably engaging said guides to facilitate guiding the latter into seating relation upon said seats and normally maintaining the valves in non-tilting engagement with said vertical guides regardless of whether said valves are open, closed or operating.

9. A combination vacuum and relief valve having a casing; wall portions in said casing forming a pressure sensitive chamber, a vacuum sensitive chamber communicating with the atmosphere and a central chamber having valved communication with said pressure and vacuum sensitive chambers; there being a lateral opening in said casing to afford communication from said central chamber to a device to be protected; there being a second lateral opening in said casing communicating with said pressure sensitive chamber, a conduit communicating with said opening and latter chamber for discharging at a location remote from said casing, a valve seat for the communication between said central chamber and said pressure sensitive chamber, a second valve seat for the communication between said central chamber and said vacuum sensitive chamber, a valve cooperating with the valve seat in said pressure sensitive chamber, and a second valve cooperating with the valve seat in said vacuum sensitive chamber, said valves having cylindrical heads larger than their communications and having smaller depending body portions, the diameter of the head of the vacuum sensitive valve and the diameter of the body of the pressure sensitive valve being the same, vertical guides in said casing to slidably engage the body of the vacuum sensitive valve, and common vertical guides slidably to engage both the body of the pressure sensitive valve and the head of the vacuum sensitive valve.

MARCUS M. DRAKE.